United States Patent
Kaita et al.

(10) Patent No.: US 7,689,335 B2
(45) Date of Patent: Mar. 30, 2010

(54) HIGHLY RELIABLE VEHICLE SYSTEM START CONTROLLER

(75) Inventors: Keiji Kaita, Nishikamo-gun (JP); Masaya Amano, Toyota (JP)

(73) Assignee: Toyota Jidosha Kabushik Kaisha, Toyota (JP)

( * ) Notice: Subject to any disclaimer, the term of this patent is extended or adjusted under 35 U.S.C. 154(b) by 1079 days.

(21) Appl. No.: 11/354,884

(22) Filed: Feb. 16, 2006

(65) Prior Publication Data

US 2006/0208568 A1 Sep. 21, 2006

(30) Foreign Application Priority Data

Mar. 18, 2005 (JP) ............... 2005-079826

(51) Int. Cl.
*F02N 11/00* (2006.01)
(52) U.S. Cl. ............................. 701/36; 477/2
(58) Field of Classification Search ................ 701/22, 701/36, 54; 180/65.2, 165; 475/5; 477/2; 318/139
See application file for complete search history.

(56) References Cited

U.S. PATENT DOCUMENTS 5,939,794 A * 8/1999 Sakai et al. ............... 290/40 A
6,242,873 B1 * 6/2001 Drozdz et al. ............... 318/139
6,735,502 B2 * 5/2004 Phillips et al. ................ 701/22

FOREIGN PATENT DOCUMENTS

| EP | 1 612 408 A1 | 1/2006 |
| JP | A 2000-050513 | 2/2000 |
| JP | A 2004-020315 | 1/2004 |
| JP | A 2005-014733 | 1/2005 |

* cited by examiner

*Primary Examiner*—Dalena Tran
(74) *Attorney, Agent, or Firm*—Oliff & Berridge, PLC

(57) ABSTRACT

Start/stop decision circuit receives main and sub IG instruction signals from a hold circuit and a sub line, respectively, and if the signals match in logic, the start/stop decision circuit follows the main IG instruction signal's logic to determine whether an ignition switch is turned on/off. If the main and sub IG instruction signals attain the high and low levels, respectively, and a logic discrepancy is thus caused, and a condition is established for speculating that the vehicle is parked and therefrom a decision is made that the vehicle system will be stopped with high probability, then the start/stop decision circuit determines that the ignition switch is turned off, and start/stop decision circuit detects that the hold circuit has an ON failure and subsequently the start/stop decision circuit stops the vehicle system.

18 Claims, 8 Drawing Sheets

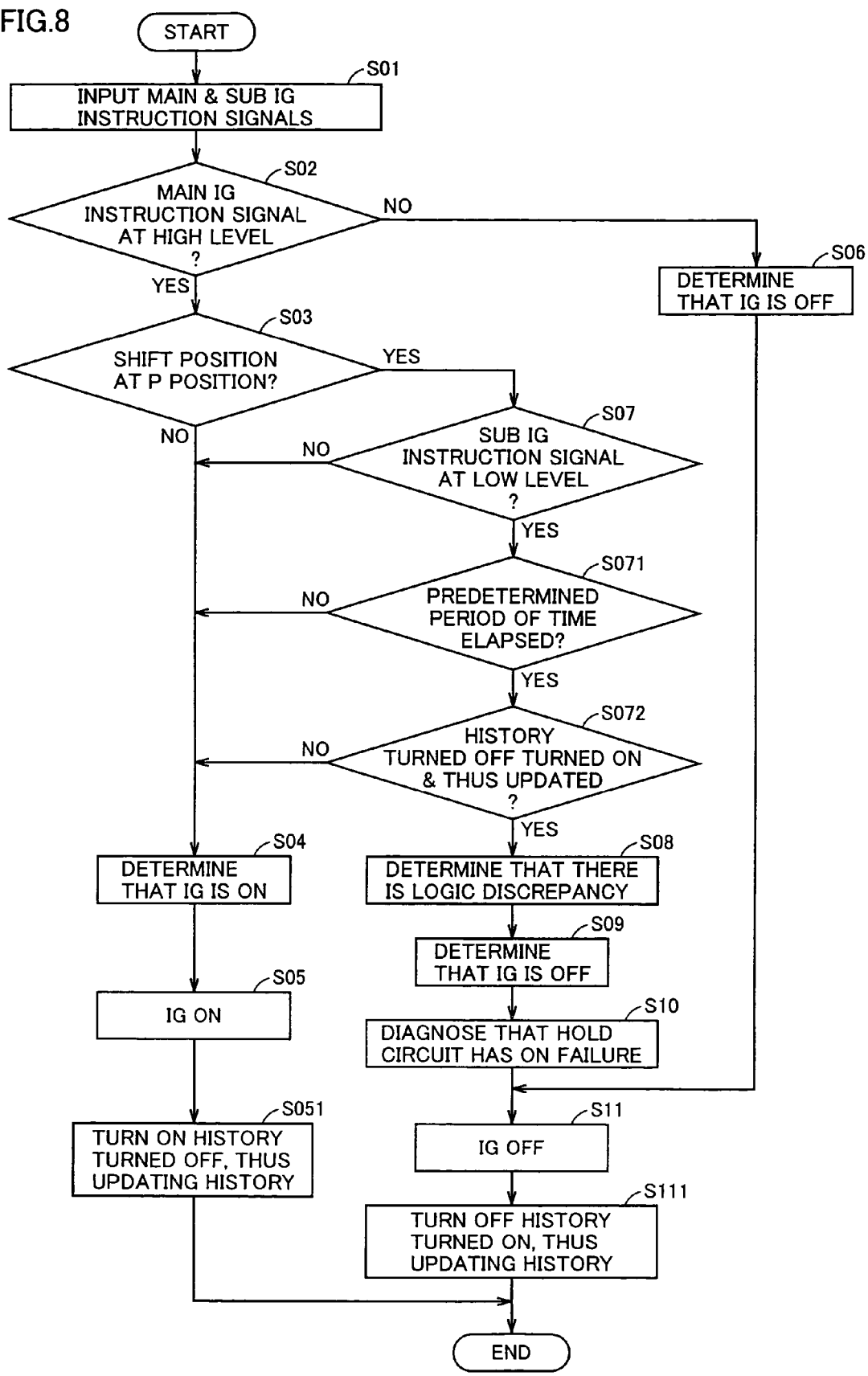

HIGHLY RELIABLE VEHICLE SYSTEM START CONTROLLER

This nonprovisional application is based on Japanese Patent Application No. 2005-079826 filed with the Japan Patent Office on Mar. 18, 2005, the entire contents of which are hereby incorporated by reference.

BACKGROUND OF THE INVENTION

1. Field of the Invention

The present invention relates generally to vehicle system start controllers and particularly to vehicle system start controllers capable of high reliably starting and stopping vehicle systems.

2. Description of the Background Art

Vehicle systems are typically started by operating an ignition switch operated by inserting an ignition key into a key hole and rotating the key to a prescribed position. The ignition switch assumes an OFF position allowing the ignition key to be inserted and removed, an accessory (ACC) position allowing car audio and other similar accessory electrical equipment to conduct, an ON position energizing the engine's ignition system, and an engine start (ST) position energizing the starter.

To start a vehicle system, for example as disclosed in Japanese Patent Laying-Open No. 2000-050513, the ignition switch is operated to assume the ON position and in response an IG signal of the logical high level is input to a controller of a power supply control unit. In response to the IG signal of the high level the power supply control unit electrically connects a relay switching between supplying and stopping power to a load. Thus a battery's power supply is supplied to a plurality of loads including units electrically controlling an engine, an A/T, a meter and the like. The control units all receive power supplied from the battery to control the vehicle's state.

To stop the vehicle system the ignition switch is operated to assume the OFF position and in response the IG signal of the logical low level is input to the controller of the power supply control unit. The power supply control unit receives the IG signal of the low level and in response electrically disconnects the relay to interrupt the power supplied from the battery to the plurality of loads.

If the vehicle system thus configured has the ignition switch failed for example by a break, the IG signal is fixed at the low level and the vehicle system cannot be started. As such, the ignition switch is required to reliably turn on.

For an analog signal circuit outputting a desired signal voltage for example for vehicular electronic control equipment a defective break detection device including a hold circuit holding a signal voltage output from the analog signal circuit and a discharge circuit causing an electric charge distributed in the analog signal circuit to be discharged to the ground is disclosed, for example as described in Japanese Patent Laying-Open No. 2004-020315.

As described in the document, the hold circuit is a charge circuit including a switch, a capacitor and the like. When the hold circuit receives an instruction from an instruction portion to take in the signal voltage the hold circuit turns on the switch and holds the signal voltage in the capacitor. When the signal voltage held in the capacitor is output to an A/D converter, it is A/D converted and output to the instruction portion.

Furthermore, the defective break detection device employs a discharge circuit to discharge simultaneously the electrical charge distributed in the analog signal circuit and the signal voltage held in the hold circuit, and after they are discharged the device holds in the hold circuit a signal voltage output from the analog signal circuit and from a result of A/D converting the held signal voltage detects whether the analog signal circuit has a defective break.

The above described defective break detection device that has the hold circuit holding a signal voltage can detect whether the analog circuit has a defective break. If the hold circuit itself has the switch for example welded and thus failed, however, the signal voltage held by the hold circuit and that output from the analog signal circuit do not match, and the vehicle will not be controlled normally. Accordingly, to provide a signal voltage increased in reliability, the hold circuit must be detected as well as the analog signal circuit for failure.

In particular, if a vehicle system start controller has such a hold circuit mounted therein and in response to the ignition switch being operated to assume the ON position the hold circuit receives the IG signal of the high level, the hold circuit holds the logical level and outputs it to the instruction portion, or an electrical control unit (ECU). If the hold circuit is failed and the logical level is fixed at the high level, operating the ignition switch to assume the OFF position cannot stop the vehicle system. In other words, the hold circuit cannot sufficiently ensure that the ignition switch can be operated to reliably turn off.

SUMMARY OF THE INVENTION

The present invention contemplates a vehicle system start controller capable of ensuring high reliability in both operations turning on and off an ignition switch.

The present vehicle system start controller includes: an operation portion configured to be set to have a first state of operation when a vehicle system stops, and a second state of operation when the vehicle system operates; a first signal generation circuit operative in response to the operation portion being set to have the second state of operation to cause a first instruction signal to transition from a first logic state to a second logic state and thus output the first instruction signal, and maintain the first instruction signal in the second logic state until the operation portion is set to have the first state of operation; a second signal generation circuit outputting a second instruction signal depending on a state of operation of the operation portion, setting the second instruction signal to have the first logic state when the operation portion has the first state of operation, and setting the second instruction signal to have the second logic state when the operation portion has the second state of operation; a vehicle state detection portion detecting a state of a vehicle; and a decision circuit determining whether the operation portion has the first or second state of operation from a logic state of the first instruction signal for the first and second instruction signals having their respective logic states matching each other, and from whether a condition for speculating that the vehicle is parked is established in the state of the vehicle detected for the first and second instruction signals having a logic discrepancy therebetween.

In accordance with the present invention if the first and second instruction signals have a logic discrepancy therebetween then from whether a condition is established for speculating that the vehicle is parked a decision is made as to whether the vehicle system can be stopped and from that decision the operation portion's state of operation can be determined. The operation portion can provide both the first and second states of operation highly reliably.

Preferably if the condition is established the decision circuit determines that the operation portion has the first state of operation and if the condition is not established the decision circuit determines that the operation portion has the second state of operation.

If a decision is made that the condition for speculating that the vehicle is parked is established and that the vehicle system will be stopped with high probability, then the decision circuit determines that the operation portion has the first state of operation (or is turned off). This can prevent at least one of the first and second signal generation circuits that has failed from stopping the vehicle system against the driver's intention. In particular, if the second signal generation circuit fails, whether the condition for speculating that the vehicle is parked is established can be referred to to detect that the vehicle system can continuously be operated. The vehicle system is not immediately stopped and its running performance is not impaired.

Preferably the decision circuit includes a failure detection portion detecting that the first signal generation circuit fails when the first and second instruction signals indicate the second and first logic states, respectively, and the condition is established.

If the first and second instruction signals have a logic discrepancy therebetween and the vehicle system will be stopped with high probability, then before the vehicle system is stopped the first signal generation circuit's failure can be detected.

Preferably the controller further includes a time counting portion counting time elapsing since the vehicle was stopped, wherein if the first and second instruction signals have a logic discrepancy therebetween, then from whether the condition is established when the time elapsing reaches a prescribed period of time, the decision circuit determines whether the operation portion has the first or second state of operation.

Preferably the prescribed period of time is set to ensure a period of time when the vehicle system operates that elapses since the vehicle was stopped before the vehicle is expected to again run.

In accordance with the present invention the decision circuit determines whether the first and second instruction signals have a logic discrepancy after the vehicle is continuously stopped for a prescribed period of time. Whether the vehicle system can be stopped or not can accurately be determined and from that decision the operation portion's state of operation can be determined. The operation portion's first and second operations can be provided more reliably.

Preferably the controller further includes a storage portion storing a history indicating that the vehicle system has been started or stopped, wherein when the first and second instruction signals have a logic discrepancy therebetween, the decision circuit determines whether the operation portion has the first or second state of operation from whether the condition is established and whether the history indicates that the vehicle system has previously been started.

Preferably when the condition is established and the history indicates that the vehicle system has immediately previously been started, the decision circuit determines that the operation portion has the first state of operation, and if the condition is established and the history does not indicate that the vehicle system has immediately previously been started, then the decision circuit determines that the operation portion has the second state of operation.

In accordance with the present invention the first signal generation circuit's failure is detected only when the vehicle system stops. In starting the vehicle system, an unnecessary failure detection can be avoided.

Preferably the vehicle state detection portion includes a portion detecting a shift position selected and the decision circuit determines that the condition is established when a parking position is selected as the shift position.

Preferably the vehicle state detection portion includes a portion detecting a state of a parking brake device selected and the decision circuit determines that the condition is established when the parking brake device is set to be activated.

In accordance with the present invention if the first and second instruction signals have a logic discrepancy therebetween then from whether the condition for speculating that the vehicle is parked is established a decision is made as to whether the vehicle system can be stopped and from that decision the ignition switch's state of operation can be determined. The ignition switch can be operated to turn on and off highly reliably.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flow chart for illustrating an operation performed to control the present vehicle system of the third embodiment to be started/stopped.

DESCRIPTION OF THE PREFERRED EMBODIMENTS

Figure 1:
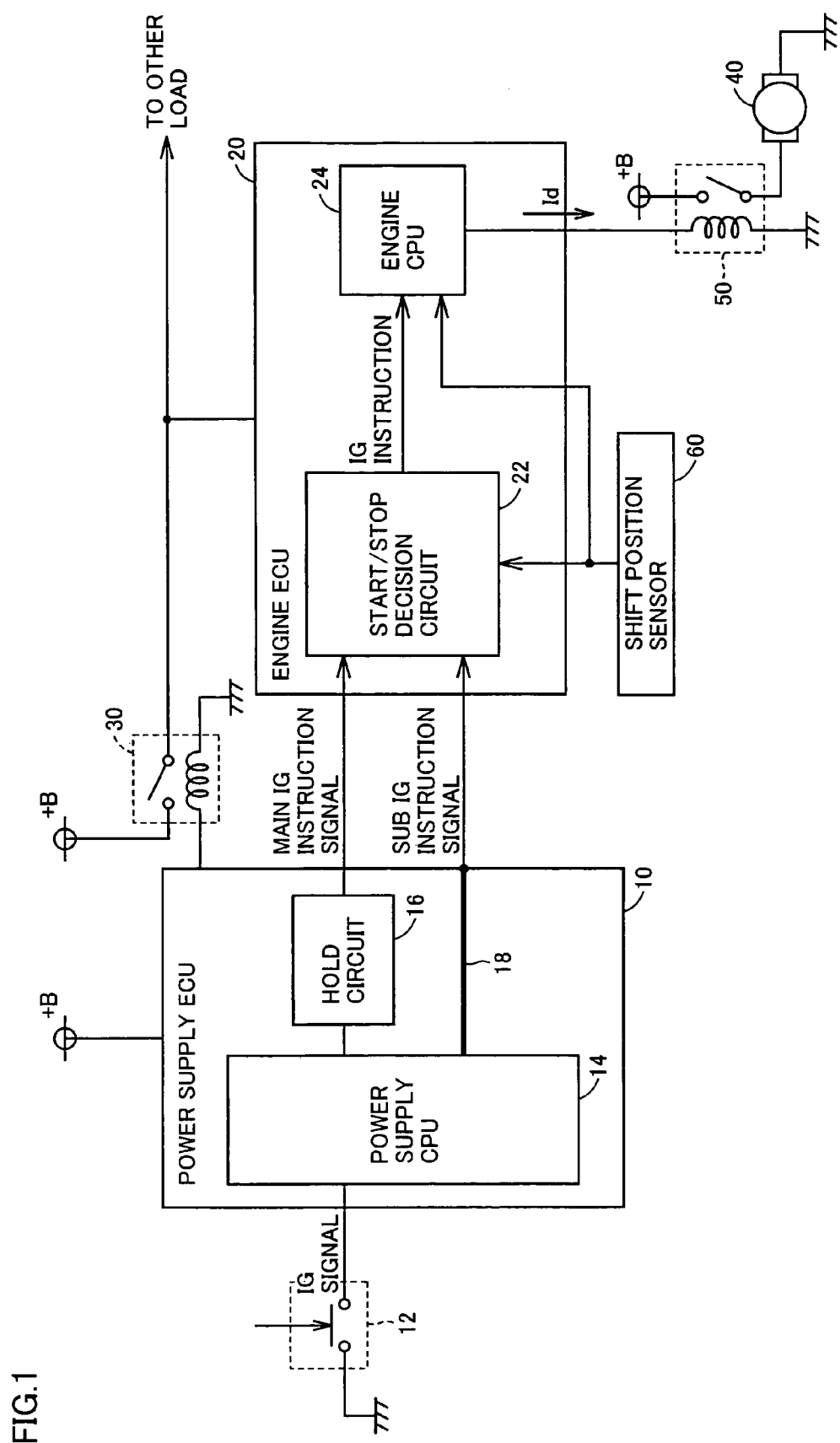
FIG. 1 is a schematic block diagram of the present vehicle system start controller in a first embodiment.

Hereinafter the present invention in embodiments will be described with reference to the drawings more specifically. In the figures, identical reference characters indicate identical or corresponding components.

First Embodiment

FIG. 1 is a schematic block diagram of the present vehicle system start controller in a first embodiment.

With reference to the figure, the vehicle system start controller includes a power supply ECU 10 generally controlling the vehicle system's power supply state, an ignition switch 12, an engine ECU 20 controlling an engine (not shown) to be started and rotated, a power supply relay 30, a starter 40, a starter relay 50*m* and a shift position sensor 60.

Ignition switch 12 is turned on in response to an ignition key (not shown) being operated to assume the ON position. This inputs an IG signal of the high level to power supply ECU 10. Furthermore, ignition switch 12 is turned off in response to the ignition key being operated to assume the OFF position. This inputs the IG signal of the low level to the power supply ECU.

Power supply ECU 10 is connected to ignition switch 12 and a battery (not shown) mounted in the vehicle and implemented for example by a nickel-hydrogen, secondary battery. Power supply ECU 10 is operable when it receives power from the battery, and when ignition switch 12 is turned on, power supply ECU 10 responsively causes an excitation circuit of power supply relay 30 to be electrically connected to turn on power supply relay 30 to supply engine ECU 20 with power from the battery. Furthermore, power supply ECU 10 outputs an IG instruction signal (main and sub IG instruction signals) to engine ECU 20 to operate or stop the vehicle system.

More specifically, power supply ECU 10 includes a power supply CPU 14, a hold circuit 16, and a sub line 18. When ignition switch 12 is turned on/off, power supply CPU 14 responsively receives an IG signal having a logical level indicating that the switch is turned on/off, and power supply CPU 14 outputs the received IG signal to hold circuit 16 and sub line 18.

When hold circuit 16 receives the IG signal, hold circuit 16 generates a main IG instruction signal having the same logical level as that of the received IG signal and outputs the generated main IG instruction signal to engine ECU 20, and hold circuit 16 holds the main IG instruction signal's logical level until ignition switch 12 is subsequently turn on or off. More specifically, when hold circuit 16 receives the IG signal of the high level in response to ignition switch 12 being turned on, hold circuit 16 holds and continues to output the main IG instruction signal at the high level in logic until ignition switch 12 is subsequently turned off. When ignition switch 12 is turned off, hold circuit 16 switches the main IG instruction signal in logic from the high level to the low level.

In the present invention the IG signal is input via hold circuit 16 as the IG instruction signal to engine ECU 20 for the following reason:

When ignition switch 12 is turned on and the vehicle system is started, and the vehicle is running, the vehicle needs to continue to run unless the driver turns off ignition switch 12. If engine ECU 20 is adapted to receive the IG signal directly, and the running vehicle has ignition switch 12 turned off for example by a break as thus fails (hereinafter referred to as "the OFF failure"), the IG signal is switched from the high level to the low level and against the driver's intention the vehicle system would be stopped. Introducing hold circuit 16 between ignition switch 12 and engine ECU 20 allows engine ECU 20 to continue to receive the main IG instruction signal of the high level despite the OFF failure. Thus the vehicle system can continue to operate to keep the vehicle running. That is, hold circuit 16 ensures that ignition switch 12 can be operated to be reliably turned on.

If in this configuration hold circuit 16 itself has failed, however, then despite that ignition switch 12 has been turned off hold circuit 16 continues to output the main IG instruction signal fixed in logic at the high level. Such a failure that causes hold circuit 16 to fix ignition switch 12 to be turned on (hereinafter also referred to as "the ON failure" of hold circuit 16) causes engine ECU 20 to recognize from the main IG instruction signal of the high level that ignition switch 12 is still turned on and maintain the vehicle system's operation. As such, hold circuit 16 cannot sufficiently ensure that ignition switch 12 is operated to be reliably turned off.

Accordingly the present invention provides for engine ECU 20 hold circuit 16 and furthermore sub line 18 in parallel therewith. More specifically, sub line 18 receives the IG signal from power supply CPU 14 and propagates the signal with its logical level maintained to output the signal as a sub IG instruction signal to engine ECU 20. More specifically, on sub line 18 is output a sub IG instruction signal switched in logic as ignition switch 12 is turned on/off Note that in the present invention hold circuit 16 and sub line 18 output their respective IG instruction signals adapted to have a relationship of master and servant therebetween because the IG instruction signal output on sub line 18 is provided to ensure the accuracy of the IG instruction signal output from hold circuit 16.

Thus if hold circuit 16 itself has the ON failure, and ignition switch 12 is turned off, the sub IG instruction signal of the low level will responsively be output to engine ECU 20. Consequently engine ECU 20 receives the main and sub IG instruction signals of the high and low levels, respectively. Engine ECU 20 compares the received signals' respective logical levels to determine whether they match, as will be described later, and engine ECU 20 determines from a result thereof whether ignition switch 12 is turned on or off, and in accordance with the decision engine ECU 20 controls the vehicle system to be started or stopped. Thus the two IG instruction signal generated from an IG signal can be applied to operate/stop the vehicle system to ensure that ignition switch 12 is operated to be reliably turned on and off.

Engine ECU 20 is connected to a battery together with another vehicular electric system (not shown). Between the battery and engine ECU 20 is provided power supply relay 30 having the excitation circuit caused by power supply ECU 10 to conduct, as has been described previously. With power supply relay 30 turned on, engine ECU 20 and the vehicular electric system (not shown) are electrically connected to the battery and receive power therefrom. Furthermore, after engine ECU 20 starts to receive power from the battery, engine ECU 20 receives the main and sub IG instruction signal from power supply ECU 10.

Engine ECU 20 includes a start/stop decision circuit 22 and an engine CPU 24.

Start/stop decision circuit 22 receives the main and sub IG instruction signals from power supply ECU 10 and from a result of comparing the signals' logical levels to determine whether they match, determines whether ignition switch 12 is turned on or off, and engine ECU 20 is driven by the decision to output an IG instruction to engine CPU 24 to start or stop the vehicle system. Engine CPU 24 receives the IG instruction and in response thereto accordingly controls the vehicle system to operate or stop. For example if start/stop decision circuit 22 determines that ignition switch 12 is turned on, start/stop decision circuit 22 outputs an IG instruction to engine CPU 24 to start the vehicle system. Engine CPU 24 receives the IG instruction and in response supplies a drive current Id to an excitation circuit of starter relay 50. As starter relay 50 conducts, starter 40 receives power from the battery and thus rotates. As starter 40 rotates, the engine starts to crank.

If the two IG instruction signals' logics referred to to determine whether ignition switch 12 is turned on/off fail to match, or a logic discrepancy exists, then it is necessary to accurately determine which signal conforms with the state of ignition switch 12.

If the signals have a logic discrepancy, at least one of hold circuit 16 and sub line 18 is considered to have failure. Accordingly, start/stop decision circuit 22 is adapted to be defined to uniformly determine that ignition switch 12 is turned off. If one of the main and sub IG instruction signals has the high level and the other has the low level, start/stop decision circuit 22 uniformly determines that it is the low level and start/stop decision circuit 22 outputs an IG instruction to stop the vehicle system.

Because of their respective configurations, hold circuit 16 and sub line 18 have tendencies, respectively, in frequency to fail. More specifically, hold circuit 16 relatively more often has a failure fixing the main IG instruction signal at the high level and thus outputting the signal (i.e., the ON failure) than the OFF failure. In contrast, sub line 18 has a higher probability of a failure fixing the sub IG instruction signal at the low level because of a break or the like and thus outputting the signal (i.e., the OFF failure) than the ON failure. Accordingly, should the main and sub IG instruction signals have a logic discrepancy therebetween, in most cases the main and sub IG instruction signals would indicate the high and low levels, respectively.

In such a case, if the aforementioned definition is followed, start/stop decision circuit 22 determines that ignition switch 12 is turned off. In accordance therewith if the sub IG instruction signal has the low level a decision is constantly made that ignition switch 12 is turned off regardless of the logic of the main IG instruction signal, and only when the main and sub IG instruction signals both have the high level a decision is made that ignition switch 12 is turned on. In other words, turning on/off of ignition switch 12 corresponds to the logic of the sub IG instruction signal in a one to one relationship. This, however, renders the operation turning on ignition switch 12 substantially no more reliable than sub line 18 outputting the sub IG instruction signal, and the significance of providing hold circuit 16, as originally intended, would be impaired.

Accordingly the present invention allows ignition switch 12 to be operated to reliably turn on and off by determining whether ignition switch 12 is turned on/off further from the vehicle's state if the two IG instruction signals have a logic discrepancy therebetween.

More specifically, the two IG instruction signals have a logic discrepancy corresponding with high probability to a case in which the main and sub IG instruction signals have the high and low levels, respectively, as has been described previously. If such a case occurs, start/stop decision circuit 22 further determines from the vehicle's state whether the vehicle system will be stopped with high probability, and if so, start/stop decision circuit 22 determines that ignition switch 12 is turned off. In contrast, if a decision is made that the vehicle system will be stopped with low probability, then start/stop decision circuit 22 determines that ignition switch 12 is turned on.

Thus the vehicle system will not be stopped against the driver's intention to be no longer capable of running. Furthermore, the battery can be prevented from running down as the vehicle system continues to operate as a decision that ignition switch 12 is turned on is made despite that the vehicle has been stopped. Thus the ignition switch can be operated to reliably turn on and off.

The present invention in the first embodiment provides a start/stop decision circuit effecting a decision operation, as will be described hereinafter more specifically.

With reference to FIG. 1, start/stop decision circuit 22 receives the main IG instruction signal from hold circuit 16 of power supply ECU 10, the sub IG instruction signal from sub line 18, and a shift position detected by shift position sensor 60. If the two IG instruction signals match in logic then start/stop decision circuit 22 determines from the main IG instruction signal's logic whether ignition switch 12 is turned on or off. If the main and sub IG instruction signals both have the high level and thus match, start/stop decision circuit 22 determines that ignition switch 12 is turned on and start/stop decision circuit 22 outputs an IG instruction to engine CPU 24 to operate the vehicle system. If the main and sub IG instruction signals both have the low level and thus match, then start/stop decision circuit 22 determines that ignition switch 12 is turned off and start/stop decision circuit 22 outputs an IG instruction to engine CPU 24 to stop the vehicle system.

Note the two IG instruction signals have a logic discrepancy therebetween then start/stop decision circuit 22 determines from the detected shift position whether ignition switch 12 is turned on or off, as described hereinafter.

Shift position sensor 60 detects a shift position, i.e., a position of a shift lever (not shown) operated by a driver, and outputs the detected shift position to engine CPU 24 as well as start/stop decision circuit 22. The shift position is, as is well known, selected to assume a drive (D) position, a non drive position (a neutral (N) position or a parking (P) position or the like) depending on the vehicle's state. For example, if the driver desires to park the vehicle the P position (or the parking position) is selected. In the present invention shift position sensor 60 configures means for detecting a state of a vehicle.

Start/stop decision circuit 22 receives a shift position from shift position sensor 60, and in response thereto detects the vehicle's state and from that detection determines whether a speculation is made that the vehicle will be parked. More specifically, start/stop decision circuit 22 speculates that the vehicle is parked if the P position is assumed. Hereinafter this condition will also be referred to as a condition for speculating that the vehicle is parked. From whether the condition is established, start/stop decision circuit 22 determines whether the vehicle system will be stopped with highly probability. In doing so, start/stop decision circuit 22 determines that the condition is established from that fact that the current shift position is the P position. From the decision that the condition is established, start/stop decision circuit 22 determines that the vehicle system will be stopped with high probability. In contrast, if the current shift position is other than the P position, start/stop decision circuit 22 determines that the condition is not established and from that decision start/stop decision circuit 22 determines that the vehicle system will be stopped with low probability.

If the main and sub IG instruction signals have a logic discrepancy therebetween and a decision is also made that the vehicle system will be stopped with high probability, start/stop decision circuit 22 determines that ignition switch 12 is turned off and start/stop decision circuit 22 outputs an IG instruction to engine CPU 24 to stop the vehicle system. The vehicle system is thus controlled by engine CPU 24 to stop.

If the main and sub IG instruction signal have a logic discrepancy therebetween and a decision is also made that the vehicle system will be stopped with low probability, start/stop decision circuit 22 determines that ignition switch 12 is turned on and start/stop decision circuit 22 outputs an IG instruction to engine CPU 24 to operate the vehicle system. The vehicle system is thus controlled by engine CPU 24 to continue to operate.

In accordance with the present invention if hold circuit 16 has the ON failure fixing the main IG instruction signal at the high level start/stop decision circuit 22 can determine with a high probability from a current shift position assuming the P position that the driver desires to stop the vehicle system, and start/stop decision circuit 22 can apply the sub IG instruction signal of the low level to ensure that the vehicle system is stopped. Furthermore the ON failure of hold circuit 16 can also be detected.

In contrast, if sub line 18 has the OFF failure providing the sub IG instruction signal of the low level, start/stop decision circuit 22 can determine from a current shift position selected to be other than the P position that the driver desires to continue to operate the vehicle system, and start/stop decision circuit 22 can apply the main IG instruction signal of the high level to ensure that the vehicle system continues to operate.

Note that thereafter while the vehicle is running, the OFF failure of sub line 18 continues to fix the sub IG instruction at the low level. However, from the detected shift position, whether the driver desires to stop the vehicle system can constantly be determined, and the OFF failure of sub line 18 does not negatively affect the vehicle's running performance.

Figure 2:
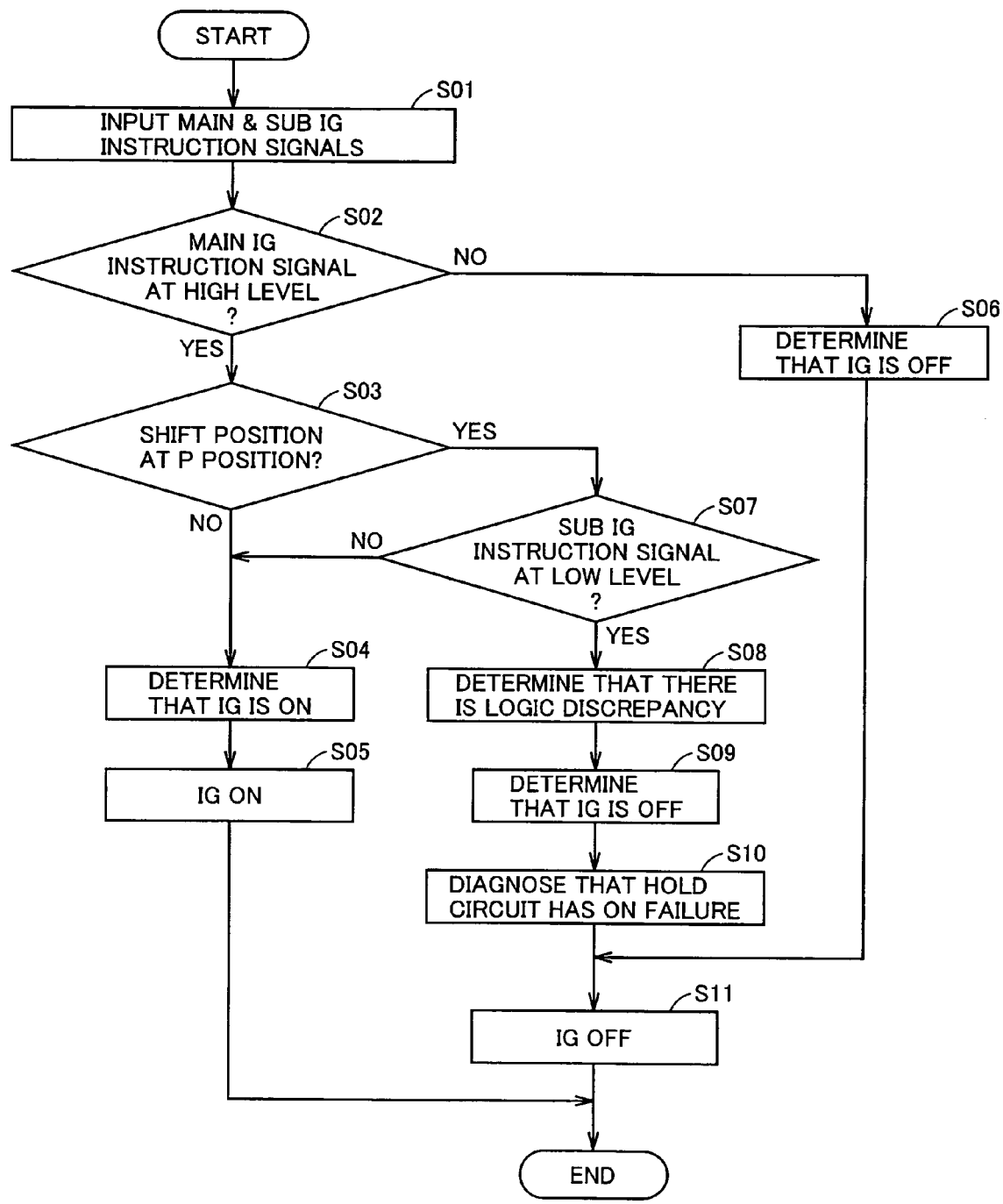
FIG. 2 is a flow chart for illustrating an operation performed to control the present vehicle system of the first embodiment to be started/stopped.

FIG. 2 is a flow chart for illustrating an operation controlling the vehicle system to start/stop in the first embodiment of the present invention.

With reference to the figure, start/stop decision circuit 22 of engine ECU 20 receives the main IG instruction signal of hold circuit 16 of power supply ECU 10, and the sub IG instruction signal from sub line 18 (step S01). Furthermore, start/stop decision circuit 22 receives a shift position from shift position sensor 60. Start/stop decision circuit 22 then follows the following steps to determine whether ignition switch 12 is turned on or off.

Initially, start/decision circuit 22 determines whether the main IG instruction signal is logic high (step S02). If so, start/stop decision circuit 22 determines whether the detected shift position is the P position (step S03).

If the shift position is not the P position, start/stop decision 22 determines that ignition switch 12 is turned on (step S04), since if the main IG instruction signal has the high level and the current shift position is not the P position then a decision is made with a high probability that the driver desires to continue to operate the vehicle system, and accordingly, regardless of the logic of the sub IG instruction signal, ignition switch 12 is continuously turned on. As such, if sub line 18 has the OFF failure, and the P position is not selected, the vehicle system can still be operated to allow the vehicle to run.

If in step S03 start/stop decision circuit 22 determines that the current shift position is the P position, start/stop decision circuit 22 determines whether the sub IG instruction signal is logic low (step S07). If so then start/stop decision circuit 22 determines that the main and sub IG instruction signals have a logic discrepancy (step S08). More specifically, start/stop decision circuit 22 determines that there is a logic discrepancy from the main IG instruction signal having the high level indicating that ignition switch 12 is turned on and the sub IG instruction signal having the low level indicating that ignition switch 12 is turned off. In contrast, if in step S07 a decision is made that the sub IG instruction signal is logic high, i.e., it is of the high level in logic and thus matches, then start/stop decision circuit 22 determines that ignition switch 12 is turned on (step S04) and the vehicle system is continuously operated (step S05).

If in step S08 a logic discrepancy is determined, start/stop decision circuit 22 determines from the current shift position which IG instruction signal has a logic conforming with the state of ignition switch 12. More specifically, as the current shift position is the P position, a decision is made that the condition for speculating that the vehicle is parked is established and that the vehicle system will be stopped with high probability. Accordingly, start/stop decision circuit 22 determines that ignition switch 12 is turned off (step S09) and start/stop decision circuit 22 outputs an IG instruction to engine CPU 24 to stop the vehicle system. From the fact that the main IG instruction signal holds the high level while ignition switch 12 is turned off, start/stop decision circuit 22 detects that hold circuit 16 has the ON failure (step S10). After the ON failure of hold circuit 16 is detected, engine CPU 24 responds to IG instruction by controlling the vehicle system to stop (or ignition to be turned off). The vehicle system is thus stopped (step S11).

In contrast, if in step S02 a decision is made that the main IG instruction signal has the low level, then start/stop decision circuit 22 determines that ignition switch 12 is turned off (step S06). Herein if the main IG instruction signal has the low level the above described logic discrepancy decision is not made and instead a decision is immediately made that ignition switch 12 is turned off, since hold circuit 16 is resistant to the OFF failure and its low-level logic is highly reliable, and if hold circuit 16 should have the OFF failure then the sub IG instruction signal on sub line 18 will start/stop the vehicle system and the operation turning on ignition switch 12 is insufficiently ensured. Engine CPU 24 responds to IG instruction by controlling the vehicle system to be stopped (step S11).

Exemplary Variation

Figure 3:
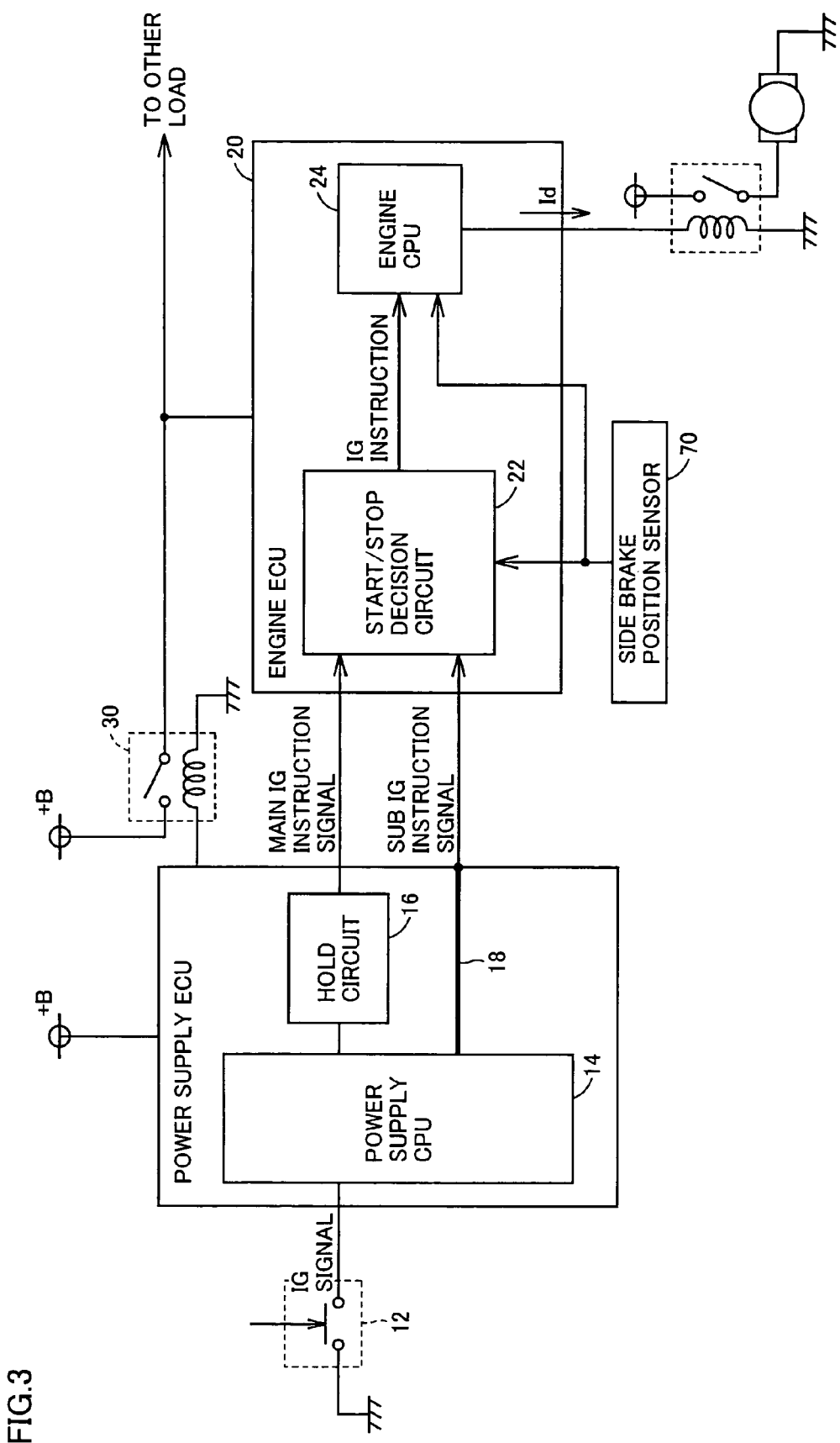
FIG. 3 is a schematic block diagram of the present vehicle system start controller of the first embodiment in an exemplary variation.

FIG. 3 is a schematic block diagram of a vehicle system start controller in an exemplary variation of the first embodiment of the present invention.

With reference to the figure, the exemplary variation provides a vehicle system start controller corresponding to FIG. 1 having a vehicle state detection means or shift position sensor 60 replaced with a side brake position sensor 70.

Side brake position sensor 70 is provided at a base of a side brake lever (not shown) provided in the vehicle's cabin and serving as a parking brake. Although not shown, the side brake lever is connected by a wire to a driving wheel locking mechanism provided in a vicinity of a driving wheel to configure a parking brake device. It is operated by the driver to mechanically lock the wheel's rotation. Side brake position sensor 70 detects an angle of the side brake formed as it is operated, and in response to the detected angle side brake position sensor 70 outputs a signal to start/stop decision circuit 22 and engine CPU 24 to indicate that the side brake lever is operated to assume a parking position (corresponding to the ON position) and the parking brake device is activated.

Start/stop decision circuit 22 receives from side brake position sensor 70 the signal indicating the side brake lever's position assumed, and in response thereto detects the vehicle's state and from that detection determines whether the condition for speculating that the vehicle is parked is established. If so then a decision is made that the vehicle system will be stopped with high probability. More specifically, start/stop decision circuit 22 determines whether the condition is established from whether the side brake lever is operated to assume the ON position. If so start/stop decision circuit 22 determines that the condition is established and from that decision determines that the vehicle system will be stopped with high probability. In contrast, if the side brake lever is operated to assume the OFF position, start/stop decision circuit 22 determines that the vehicle is now capable of running and the condition is not established, and from that decision, start/stop decision circuit 22 determines that the vehicle system will be stopped with low probability.

If the main and sub IG instruction signals have a logic discrepancy therebetween and a decision is made that the vehicle system will be stopped with high probability, start/stop decision circuit 22 determines that ignition switch 12 is turned off. In contrast, if the main and sub IG instruction signals have a logic discrepancy therebetween and a decision is made that the vehicle system will be stopped with low probability, start/stop decision circuit 22 determines that ignition switch 12 is turned on. Then, as has been described hereinabove, start/stop decision circuit 22 follows the decision to output an IG instruction to engine CPU 24 to operate/ stop the vehicle system. The vehicle system is thus controlled by engine CPU 24 to stop or continue to operate.

Figure 4:
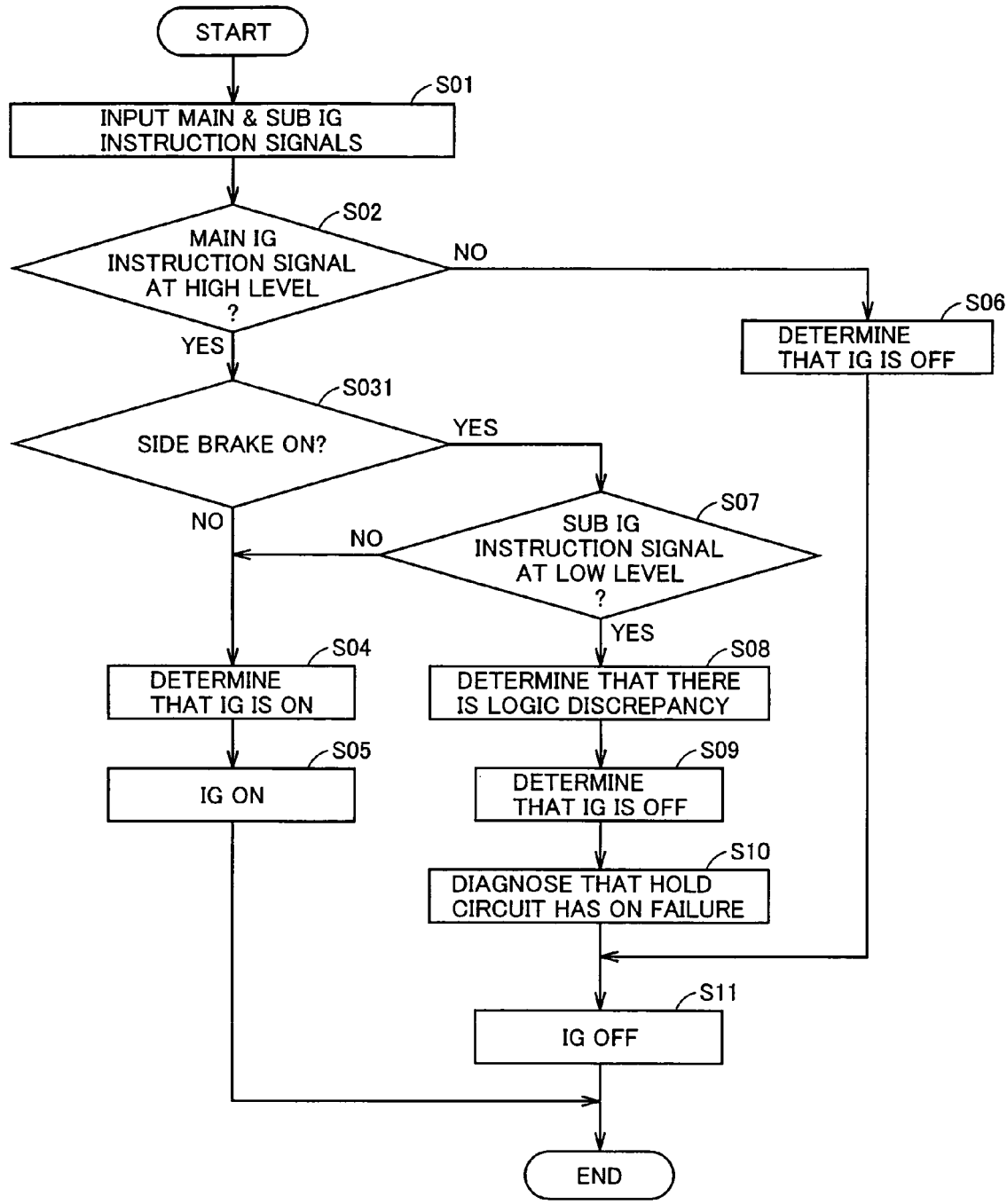
FIG. 4 is a flow chart for illustrating an operation performed to control the present vehicle system of the first embodiment in the exemplary variation to be started/stopped.

FIG. 4 is a flow chart for illustrating an operation controlling the vehicle system to start/stop in the exemplary variation of the first embodiment of the present invention. The FIG. 4 flow chart corresponds to the FIG. 2 flow chart having step S03 replaced with step S31.

After step S02, start/stop decision circuit 22 determines from a signal received from side brake position sensor 70 whether the side brake lever is operated to assume the ON position (step S031). If so, start/stop decision circuit 22 determines that the condition for speculating that the vehicle is parked is established and that the vehicle system will be stopped with high probability, and start/stop decision circuit 22 determines whether there is a logic discrepancy, as indicated at step S07. If so, start/stop decision circuit 22 detects that hold circuit 16 has the ON failure (step S10), and then stops the vehicle system.

If in step S031 the side brake lever is operated to assume the OFF position, start/stop decision circuit 22 determines that the condition for speculating that the vehicle is parked is not established and that the vehicle system will continuously be operated with high probability, and if a decision is made that ignition switch 12 is turned on (step S04) start/stop decision circuit 22 allows engine CPU 24 to continue to operate the vehicle system (step S05).

Thus in the first embodiment of the present invention if two IG instruction signals have a logic discrepancy therebetween, the vehicle's state can be detected and from that detection whether the vehicle system can be stopped or not can be determined, and from that decision whether the ignition switch is turned on/off can be determined. This ensures high reliability of the ignition switch in turning on and off.

Furthermore, if the two IG instruction signals have a logic discrepancy, the hold circuit's ON failure can be detected before the ignition switch is operated to turn off.

Furthermore if the sub line has the OFF failure, a shift position can help to detect that the vehicle system can continuously be operated, and the vehicle system will not immediately be stopped. The vehicle's running performance is not impaired.

Second Embodiment

Figure 5:
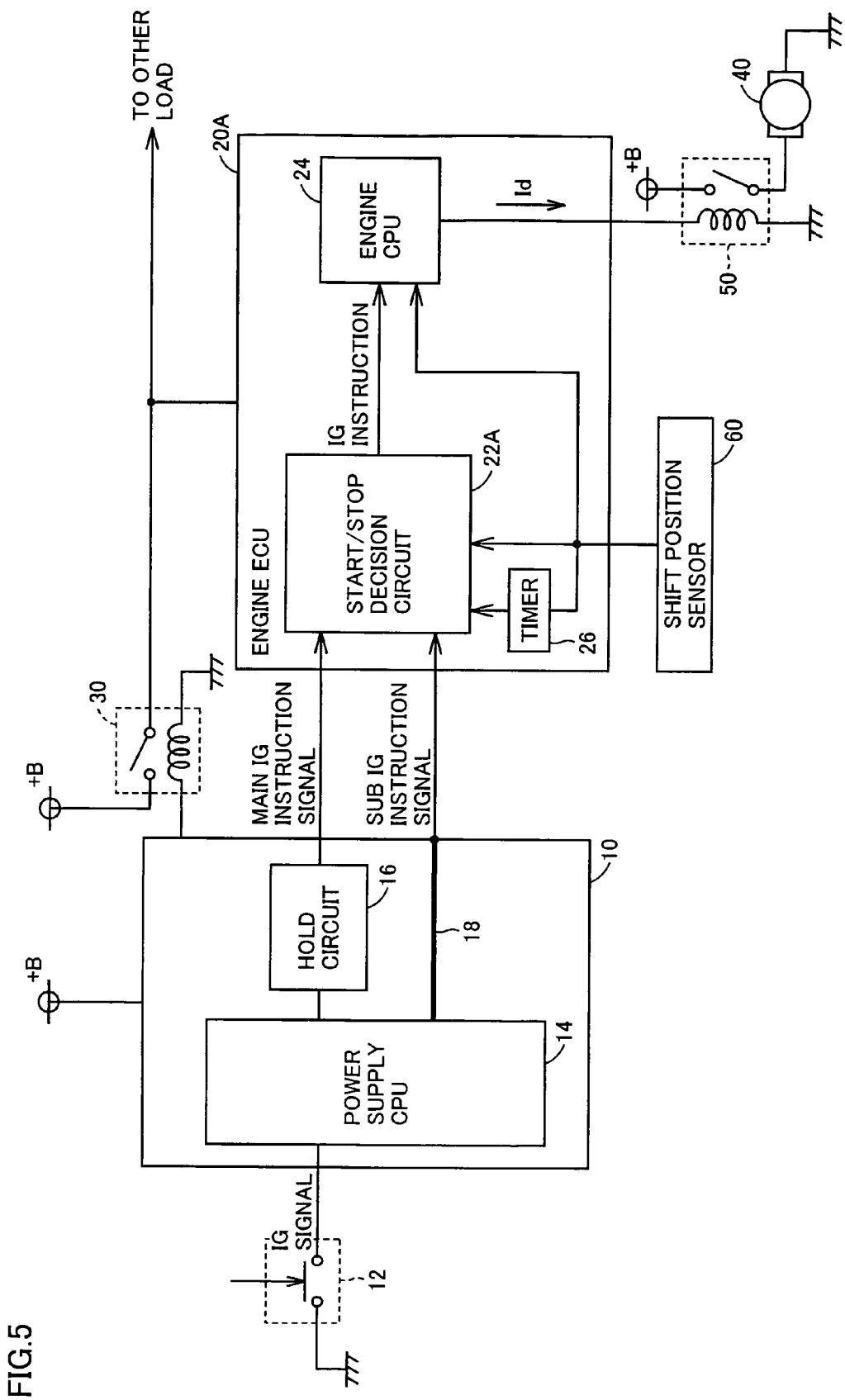
FIG. 5 is a schematic block diagram of the present vehicle system start controller in a second embodiment.

FIG. 5 is a schematic block diagram of the present vehicle system start controller in a second embodiment.

With reference to the figure, the present embodiment provides a vehicle system start controller corresponding to FIG. 1 having engine ECU 20 replaced with an engine ECU 20A.

Engine ECU 20A includes a start/stop decision circuit 22A, engine CPU 24, and a timer 26.

Start/stop decision circuit 22A receives the main and sub IG instruction signals from hold circuit 16 and sub line 18, respectively, a shift position from shift position sensor 60, and time count information from timer 26.

Timer 26 receives a selected shift position from shift position sensor 60, and if the P position is selected to be the current shift position, timer 26 responsively starts to count time and outputs the time count information to start/stop decision circuit 22A. Start/stop decision circuit 22A thus receives the time count information indicating a period of time having elapsed since the P position was selected to be the current shift position. Hereinafter the time count information output from timer 26 will also simply be referred to as a "time having elapsed".

In the present embodiment start/stop decision circuit 22A has a preset, prescribed period as a threshold value for a time having elapsed as received from timer 26. When the time having elapsed exceeds the prescribed period, start/stop decision circuit 22A follows the above described method to determine whether ignition switch 12 is turned on or off from a result of comparing the main and sub IG instruction signals to determine whether the signals match in logic, and a shift position. If the P position is selected as a shift position, then upon the elapse of the prescribed period, a decision is made as to whether ignition switch 12 is turned on/off.

As a condition for determining whether the vehicle system is started/stopped, the time having elapsed is added for the following reason:

Some drivers also select the P position when they wait at a red light or are caught in a traffic jam or the like and accordingly, temporarily stop their vehicles, In the first embodiment if a vehicle is thus temporarily stopped and sub line 18 also has the OFF failure, start/stop decision circuit 22 determines that the two IG instruction signals have a logic discrepancy therebetween and that ignition switch 12 is turned off As a result, while the vehicle is temporarily stopped, the vehicle system would be stopped against the driver's intention.

In contrast, if whether ignition switch 12 is turned on/off is determined after the P position is selected as the current shift position when the prescribed period of time elapses, rather than immediately after the P position is selected as the current shift position, the vehicle temporarily stopped is now again running and a position other than the P position (e.g., the D position) has been selected as the current shift position. As such, if sub line 18 has the OFF failure and the two IG instruction signals thus have a logic discrepancy therebetween, a decision is made that ignition switch 12 is turned on. Consequently the vehicle system will not be stopped after the prescribed period of time has elapsed. Furthermore, when the vehicle is running, and hold circuit 16 has the ON failure, the vehicle still can run without interference, and uselessly detecting whether hold circuit 16 has failure can be avoided.

Note that the prescribed period of time is set to ensure a period when the vehicle system operates that elapses since a time point at which the vehicle is stopped before a time point at which the vehicle is expected to again run.

Furthermore, if the prescribed period of time is a sufficiently long period of time and during that period of time sub line 18 has the OFF failure, and when the prescribed period of time elapses, hold circuit 16 outputs the main IG instruction signal indicating the low level in response to ignition switch 12 being turned off As such, without a logic discrepancy caused, a decision can immediately be made that ignition switch 12 is turned off.

If hold circuit 16 has the ON failure then after the prescribed period of time elapses the main IG instruction signal continues to indicate the high level, and if sub line 18 has the OFF failure or is normal the above described logic discrepancy decision is made. Then the ON failure of hold circuit 16 is detected and the vehicle system is subsequently stopped.

Figure 6:
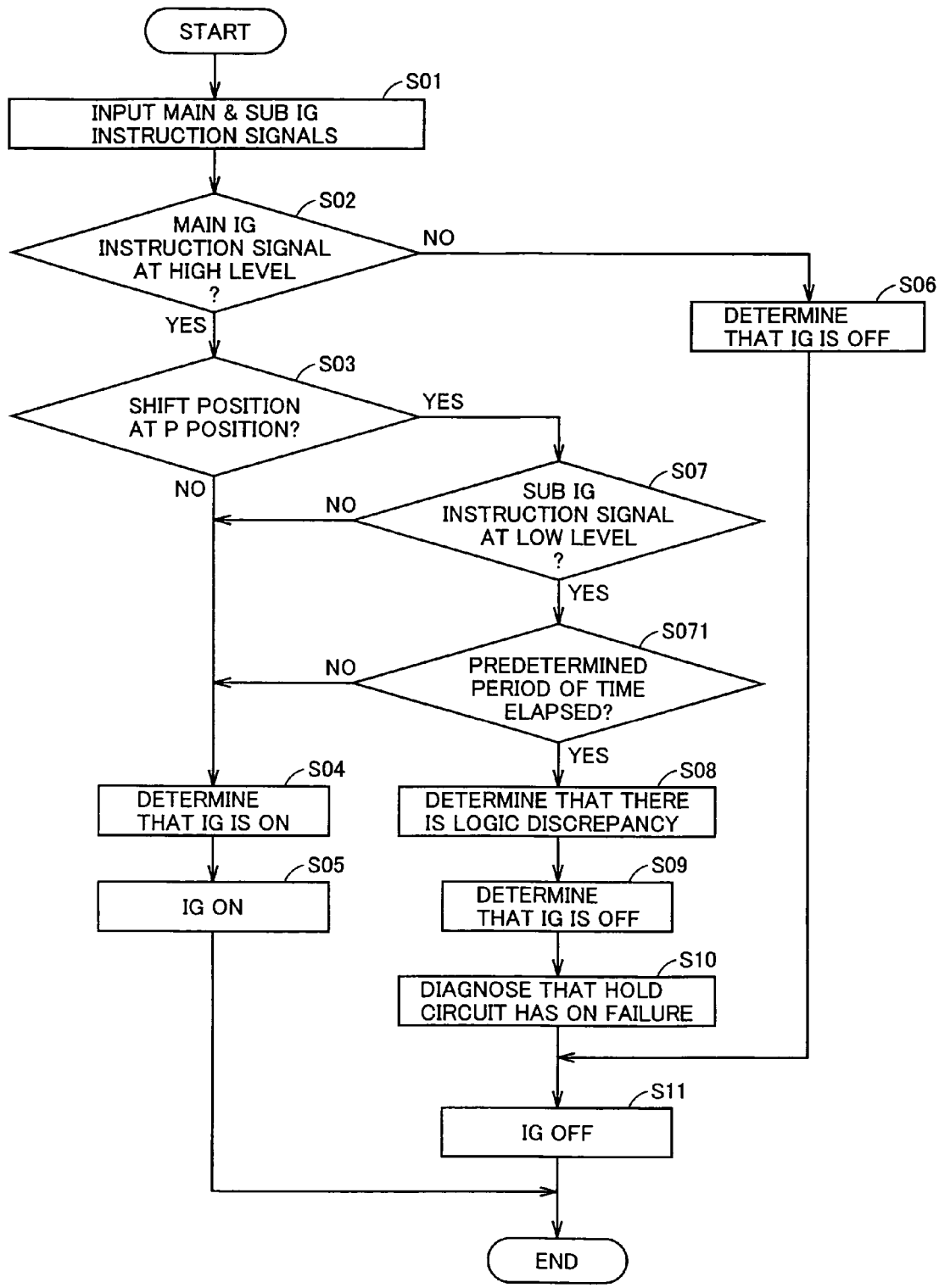
FIG. 6 is a flow chart for illustrating an operation performed to control the present vehicle system of the second embodiment to be started/stopped.

FIG. 6 is a flow chart for illustrating an operation controlling the vehicle system to start/stop in the second embodiment of the present invention. The FIG. 6 flow chart corresponds to the FIG. 2 flow chart having a step S071 inserted between steps S07 and S08.

If in step S07 a decision is made that the main and sub IG instruction signals have a logic discrepancy therebetween, start/stop decision circuit 22A further refers to time count information received from timer 26 to determine whether the prescribed period of time has elapsed since the P position was selected as a shift position (step S071).

If so, start/stop decision circuit 22A determines that the main and sub IG instruction signals have a logic discrepancy therebetween (step S08) As the current shift position is the P position and the condition for speculating that the vehicle is parked is established, start/stop decision circuit 22A determines that the vehicle system will be stopped with high probability and that ignition switch 12 is turned off (step S09). As the main IG instruction signal holds the high level, start/stop decision circuit 22A detects that hold circuit 16 has the ON failure (step S10). After the ON failure of hold circuit 16 is detected, engine CPU 24 responds to an IG signal indicating that the vehicle system should be stopped by controlling the vehicle system to stop (or ignition to be turned off). The vehicle system is thus stopped (step S11).

In contrast, if in step S071 a decision is made that the prescribed period of time has not elapsed, then start/stop decision circuit 22A does not make the above described logic discrepancy decision and instead determines that ignition switch 12 is turned on (step S04). The vehicle system thus continues to operate (step S05).

Note that the present embodiment can also have shift position sensor 60 of FIG. 5 configured by side brake position sensor 70, as indicated in the exemplary variation of the first embodiment. In that case, timer 26 starts to operate to count time when the side brake lever (not shown) is operated to assume the ON position, and timer 26 outputs its time count information to start/stop decision circuit 22A.

Thus in the second embodiment of the present invention after the vehicle continues to stop for a prescribed period of time, whether two IG instruction signals have a logic discrepancy therebetween can be determined and therefrom whether the vehicle system can be stopped or not can accurately be determined, and from that decision whether the ignition switch is turned on/off can be determined. As a result, the ignition switch can be operated to turn on and off furthermore reliably.

Third Embodiment

Figure 7:
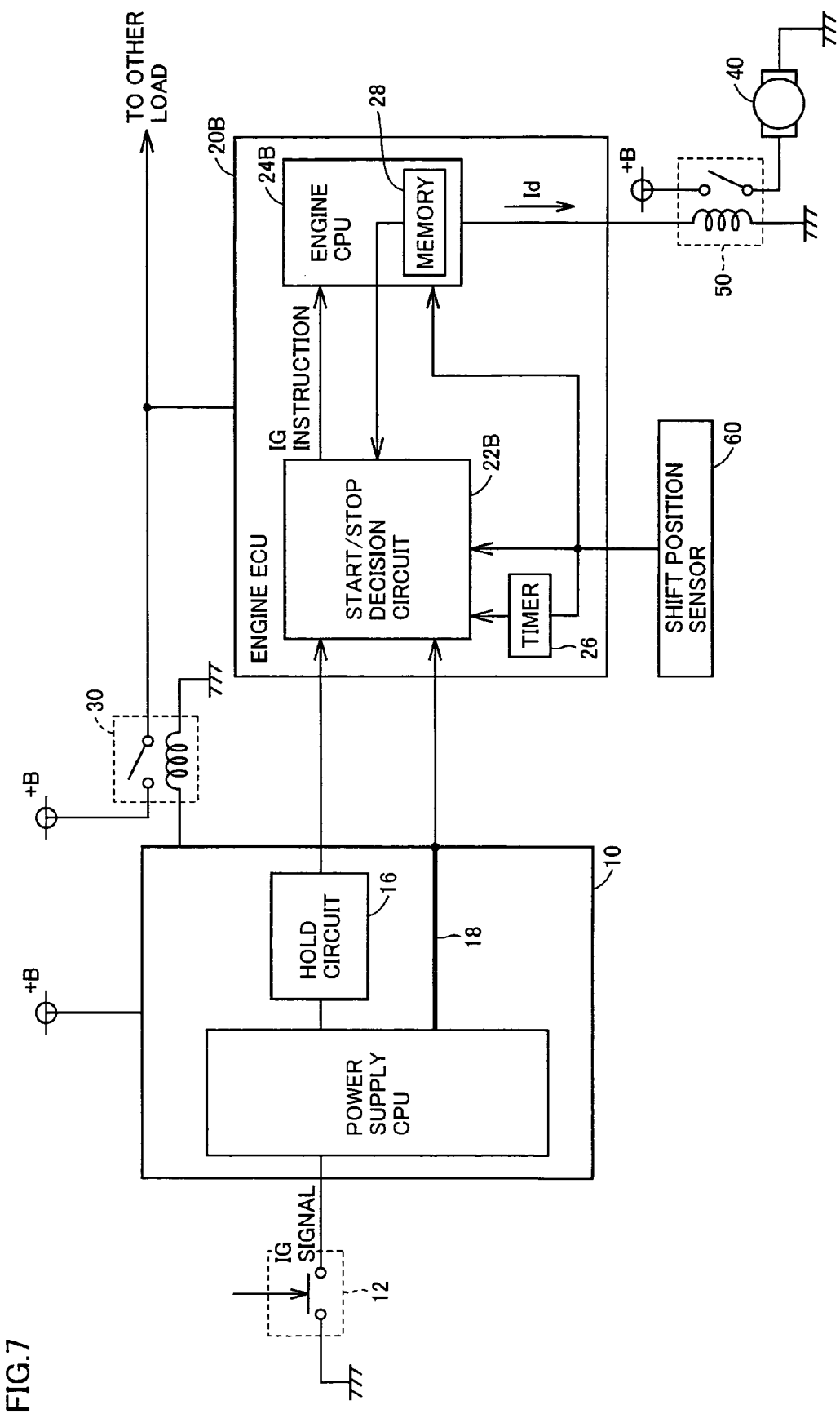
FIG. 7 is a schematic block diagram of the present vehicle system start controller in a third embodiment.

FIG. 7 is a schematic block diagram of the present vehicle system start controller in a third embodiment.

With reference to the figure, the present embodiment provides a vehicle system start controller corresponding to that of FIG. 5 having engine ECU 20A replaced with an engine ECU 20B.

Engine ECU 20B includes a start/stop decision circuit 22B, an engine CPU 24B, and timer 26.

Start/stop decision circuit 22B receives the main and sub IG instruction signals from hold circuit 16 and sub line 18, respectively, a shift position from shift position sensor 60, and time count information from timer 26. As has been described hereinabove in the second embodiment, timer 26 counts time elapsing since the P position was selected as a shift position, and timer 26 outputs the counted time to start/stop decision circuit 22B.

Start/stop decision circuit 22B also receives from a memory 28 of engine CPU 24B a history of the vehicle system indicating that the vehicle system has previously been started/stopped. Memory 28 stores the history whenever engine CPU 24B starts or stops the vehicle system in response to an IG instruction received from start/stop decision circuit 22B. More specifically, when the vehicle stopped is started, memory 28 responsively turns on the history that has been turned off and thus updates the history. Furthermore, when the vehicle system in operation is stopped, memory 28 responsively turns off the history that has been turned on and thus updates the history.

From a result of comparing the main and sub IG instruction signals to determine whether the signals match in logic, and the current shift position, start/stop decision circuit 22B determines whether ignition switch 12 is turned on/off. In doing so, start/stop decision circuit 22B makes the decision from a period of time having elapsed, as received from timer 26, and in addition thereto the vehicle system's history received from memory 28, as will be described hereinafter more specifically.

Start/stop decision circuit 22B, as well as start/stop decision circuit 22A, has a prescribed period of time as a threshold value for the period of time having elapsed as received from timer 26. If the period of time having elapsed exceeds the prescribed period of time and the vehicle system's history turned off has been turned on and thus updated, start/stop decision circuit 22B follows the above described method to determine whether ignition switch 12 is turned on or off from a result of comparing the main and sub IG instruction signals to determine whether the signals match in logic, and the shift position. If the current shift position is the P position, then when the prescribed period of time elapses and the vehicle system has also been started and operated, whether ignition switch 12 is turned on/off is determined.

As a condition for determining whether the vehicle system is started/stopped the vehicle system's history is additionally introduced for the following reason:

A state in which the P position is selected as a shift position includes as a first state a state in which ignition switch 12 is turned on and in response thereto the vehicle system is started and thus operated, and when the current trip ends the shift position is switched from the D position to the P position to park the vehicle. Note that currently the vehicle system's history turned off has been turned on and thus updated.

Furthermore, as a second state is included a state in which when the previous trip ends, ignition switch 12 is turned off and the vehicle system stopped and thereafter the vehicle is held parked. Note that currently the vehicle system's history turned on has been turned off and thus updated.

When these two states are compared, the first state has the vehicle system shifted to be stopped, whereas in the second state when a subsequent trip starts, it is expected that the driver desires to start the vehicle system. More specifically, for the former, subsequently the vehicle system is stopped, whereas for the latter, the vehicle system is started.

Herein in the operation that determines whether the vehicle system is started/stopped, as described in the previous embodiment, if the current shift position is the P position and the main and sub IG instruction signals have a logic discrepancy therebetween, a decision is made that ignition switch 12 is turned off and the vehicle system is stopped. If this operation is applied to the first and second states, and hold circuit 16 has the ON failure and accordingly the two IG instruction signals have a logic discrepancy therebetween, then for either the first or second state the vehicle system will be stopped. It is not disadvantageous that the vehicle system is stopped in the first state. In the second state, however, if ignition switch 12 is turned on and thereafter the shift position is allowed to assume the P position for more than prescribed period of time, the vehicle system cannot be started and the engine indefinitely cannot be started. Furthermore, as logic discrepancy is determined, whether hold circuit 16 has the ON failure is also detected, and a failure that does not negatively affect the vehicle's running performance will uselessly be detected.

Accordingly in the present embodiment whether the main and sub IG instruction signals have a logic discrepancy therebetween is determined only when the vehicle system is in operation, i.e., the vehicle system's history turned off has been turned on and thus updated. If the history turned on has been turned off and thus updated, i.e., the vehicle system is desired to be started, such a disadvantage can be resolved that the logic discrepancy decision is not made and the vehicle system cannot be started.

Furthermore, by this configuration, whether hold circuit 16 fails is detected only when the vehicle system is stopped. It is not detected when the vehicle system is started. The ON failure of hold circuit 16 does not have a negative effect when the vehicle system is in operation, and unnecessary failure detection can be avoided.

FIG. 8 is a flow chart for illustrating an operation controlling the vehicle system to start/stop in the third embodiment of the present invention. The FIG. 8 flow chart corresponds to the FIG. 6 flow chart with a step S072 added between steps S071 and S08.

If in step S07 a decision is made that the main and sub IG instruction signals have a logic discrepancy therebetween, start/stop decision circuit 22B further refers to time count information received from timer 26 to determine whether the prescribed period of time has elapsed since the P position was selected as the current shift position (step S071).

If so, start/stop decision circuit 22B also reads the vehicle system's history stored in engine CPU 24B at memory 28 to determine whether the history turned off has been turned on and thus updated (step S072).

If so then start/stop decision circuit 22B determines that the main and sub IG instruction signals have a logic discrepancy therebetween (step S08). Then, as the current shift position is the P position and the condition for speculating that the vehicle is parked is established, start/stop decision circuit 22B determines that the vehicle system will be stopped with high probability and that ignition switch 12 is turned off (step S09). As the main IG instruction signal holds the high level, start/stop decision circuit 22A detects that hold circuit 16 has the ON failure (step S10). After the ON failure of hold circuit 16 is detected, engine CPU 24 responds to an IG instruction indicating that the vehicle system should be stopped by controlling the vehicle system to stop (or ignition to be turned off). The vehicle system is thus stopped (step S11). In response, memory 28 turns off the history turned on and thus updates the history (step S111).

If in step S072 a decision is made that the vehicle system's history turned off has not been turned on or updated, i.e., a decision is made that the history turned on has been turned off and thus updated and that the vehicle system is stopped, then start/stop decision circuit 22B does not make the above described logic discrepancy decision and instead determines that ignition switch 12 is turned on (step S04). Thus the vehicle system continues to operate (step S05). In response, memory 28 turns on the vehicle system's history turned off and thus updates the history (step S051).

Note that the present embodiment can also have shift position sensor 60 of FIG. 7 configured by side brake position sensor 70, as indicated in the exemplary variation of the first embodiment. In that case, timer 26 starts to operate to count time when the side brake lever (not shown) is operated to assume the ON position, and timer 26 outputs its time count information to start/stop decision circuit 22B.

Thus in the third embodiment of the present invention when the vehicle system is in operation and after the vehicle is stopped continuously for a predetermined period of time whether two IG instruction signals have a logic discrepancy therebetween can be determined to avoid such a disadvantage that a logic discrepancy caused in starting the vehicle system prevents the vehicle system from starting.

Furthermore, whether the hold circuit has the ON failure or not can be detected only when the vehicle system is stopped, and unnecessary failure detection in starting can be avoided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vehicle system start controller comprising:
   operation means configured to be set to have a first state of operation when a vehicle system stops, and a second state of operation when said vehicle system operates;
   a first signal generation circuit operative in response to said operation means being set to have said second state of operation to cause a first instruction signal to transition from a first logic state to a second logic state and thus output said first instruction signal, and maintain said first instruction signal in said second logic state until said operation means is set to have the first state of operation;
   a second signal generation circuit outputting a second instruction signal depending on a state of operation of said operation means, setting said second instruction signal to have said first logic state when said operation means has said first state of operation, and setting said second instruction signal to have said second logic state when said operation means has said second state of operation;
   vehicle state detection means detecting a state of a vehicle; and
   a decision circuit determining whether said operation means has said first or second state of operation from a logic state of said first instruction signal for said first and second instruction signals having their respective logic states matching each other, and from whether a condition for speculating that said vehicle is parked is established in said state of said vehicle detected for said first and second instruction signals having a logic discrepancy therebetween.

2. The controller according to claim 1, wherein if said condition is established said decision circuit determines that said operation means has said first state of operation and if said condition is not established said decision circuit determines that said operation means has said second state of operation.

3. The controller according to claim 2, wherein said decision circuit includes failure detection means detecting that said first signal generation circuit fails when said first and second instruction signals indicate said second and first logic states, respectively, and said condition is established.

4. The controller according to claim 3, further comprising time counting means counting time elapsing since said vehicle was stopped, wherein if said first and second instruction signals have a logic discrepancy therebetween, then from whether said condition is established when said time elapsing reaches a prescribed period of time, said decision circuit determines whether said operation means has said first or second state of operation.

5. The controller according to claim 4, wherein said prescribed period of time is set to ensure a period of time when said vehicle system operates that elapses since said vehicle was stopped before said vehicle is expected to again run.

6. The controller according to claim 5, further comprising storage means storing a history indicating that said vehicle system has been started or stopped, wherein when said first and second instruction signals have a logic discrepancy therebetween, said decision circuit determines whether said operation means has said first or second state of operation from whether said condition is established and whether said history indicates that said vehicle system has previously been started.

7. The controller according to claim 6, wherein when said condition is established and said history indicates that said vehicle system has immediately previously been started, said decision circuit determines that said operation means has said first state of operation, and if said condition is established and said history does not indicate that said vehicle system has immediately previously been started, then said decision circuit determines that said operation means has said second state of operation.

8. The controller according to claim 1, wherein:
said vehicle state detection means includes means detecting a shift position selected; and
said decision circuit determines that said condition is established when a parking position is selected as said shift position.

9. The controller according to claim 1, wherein:
said vehicle state detection means includes means detecting a state of a parking brake device selected; and
said decision circuit determines that said condition is established when said parking brake device is set to be activated.

10. A vehicle system start controller comprising:
an operation portion configured to be set to have a first state of operation when a vehicle system stops, and a second state of operation when said vehicle system operates;
a first signal generation circuit operative in response to said operation portion being set to have said second state of operation to cause a first instruction signal to transition from a first logic state to a second logic state and thus output said first instruction signal, and maintain said first instruction signal in said second logic state until said operation portion is set to have the first state of operation;
a second signal generation circuit outputting a second instruction signal depending on a state of operation of said operation portion, setting said second instruction signal to have said first logic state when said operation portion has said first state of operation, and setting said second instruction signal to have said second logic state when said operation portion has said second state of operation;
a vehicle state detection portion detecting a state of a vehicle; and
a decision circuit determining whether said operation portion has said first or second state of operation from a logic state of said first instruction signal for said first and second instruction signals having their respective logic states matching each other, and from whether a condition for speculating that said vehicle is parked is established in said state of said vehicle detected for said first and second instruction signals having a logic discrepancy therebetween.

11. The controller according to claim 10, wherein if said condition is established said decision circuit determines that said operation portion has said first state of operation and if said condition is not established said decision circuit determines that said operation portion has said second state of operation.

12. The controller according to claim 11, wherein said decision circuit includes a failure detection portion detecting that said first signal generation circuit fails when said first and second instruction signals indicate said second and first logic states, respectively, and said condition is established.

13. The controller according to claim 12, further comprising a time counting portion counting time elapsing since said vehicle was stopped, wherein if said first and second instruction signals have a logic discrepancy therebetween, then from whether said condition is established when said time elapsing reaches a prescribed period of time, said decision circuit determines whether said operation portion has said first or second state of operation.

14. The controller according to claim 13, wherein said prescribed period of time is set to ensure a period of time when said vehicle system operates that elapses since said vehicle was stopped before said vehicle is expected to again run.

15. The controller according to claim 14, further comprising a storage portion storing a history indicating that said vehicle system has been started or stopped, wherein when said first and second instruction signals have a logic discrepancy therebetween, said decision circuit determines whether said operation portion has said first or second state of operation from whether said condition is established and whether said history indicates that said vehicle system has previously been started.

16. The controller according to claim 15, wherein when said condition is established and said history indicates that said vehicle system has immediately previously been started, said decision circuit determines that said operation portion has said first state of operation, and if said condition is established and said history does not indicate that said vehicle system has immediately previously been started, then said decision circuit determines that said operation portion has said second state of operation.

17. The controller according to claim 10, wherein:
said vehicle state detection portion includes a portion detecting a shift position selected; and
said decision circuit determines that said condition is established when a parking position is selected as said shift position.

18. The controller according to claim 10, wherein:
said vehicle state detection portion includes a portion detecting a state of a parking brake device selected; and
said decision circuit determines that said condition is established when said parking brake device is set to be activated.

* * * * *